(12) United States Patent
Cleary et al.

(10) Patent No.: US 7,325,009 B1
(45) Date of Patent: Jan. 29, 2008

(54) CUSTOMER-CONTROLLED INVENTORY ACCESS

(75) Inventors: Michael J. Cleary, Ponte Vedra Beach, FL (US); Cathy R. Faulkner, Neptune Beach, FL (US); Jason R. Hall, Carrollton, TX (US); Mario A. Hernandez, Allen, TX (US); Richard L. White, St. Augustine Beach, FL (US)

(73) Assignee: Brightpoint, Inc., Plainfield, IN (US)

( * ) Notice: Subject to any disclaimer, the term of this patent is extended or adjusted under 35 U.S.C. 154(b) by 1245 days.

(21) Appl. No.: 09/681,968

(22) Filed: Jun. 30, 2001

Related U.S. Application Data

(60) Provisional application No. 60/242,248, filed on Oct. 20, 2000, provisional application No. 60/219,589, filed on Jul. 20, 2000, provisional application No. 60/218,109, filed on Jul. 13, 2000, provisional application No. 60/215,503, filed on Jun. 30, 2000.

(51) Int. Cl.
*G06F 17/00* (2006.01)
(52) U.S. Cl. .................. 707/104.1; 707/10; 707/100
(58) Field of Classification Search ..... 707/100–104.1, 707/10; 705/26–43; 713/200–202
See application file for complete search history.

(56) References Cited

U.S. PATENT DOCUMENTS

| | | | |
|---|---|---|---|
| 5,586,050 A | 12/1996 | Makel et al. | |
| 5,603,084 A | 2/1997 | Henry, Jr. et al. | |
| 5,701,453 A | 12/1997 | Maloney et al. | |
| 5,724,261 A | 3/1998 | Denny et al. | |
| 5,732,221 A | 3/1998 | Feldon et al. | |
| 5,758,329 A | 5/1998 | Wojcik et al. | |
| 5,758,331 A | 5/1998 | Johnson | |
| 5,777,876 A | 7/1998 | Beauchesne | |
| 5,778,377 A | 7/1998 | Marlin et al. | |
| 5,784,565 A | 7/1998 | Lewine | |
| 5,809,243 A | 9/1998 | Rostoker et al. | |
| 5,826,242 A | 10/1998 | Montulli | |
| 5,852,819 A | 12/1998 | Beller | |
| 5,860,068 A | 1/1999 | Cook | |
| 5,887,253 A | 3/1999 | O'Neil et al. | |
| 5,897,622 A | 4/1999 | Blinn et al. | |
| 5,899,980 A | 5/1999 | Wilf et al. | |
| 5,928,329 A | 7/1999 | Clark et al. | |
| 5,930,472 A | 7/1999 | Smith | |
| 5,930,792 A | 7/1999 | Polcyn | |
| 5,950,150 A | 9/1999 | Lloyd et al. | |
| 5,956,483 A | 9/1999 | Grate et al. | |
| 5,960,405 A | 9/1999 | Trefethan et al. | |
| 5,960,411 A | 9/1999 | Hartman et al. | |
| 5,974,430 A | 10/1999 | Mutschler, III et al. | |

(Continued)

OTHER PUBLICATIONS http://www.usps.com/shipping/trackandconfirmfaqs.htm#H3.*

(Continued)

*Primary Examiner*—David Jung
(74) *Attorney, Agent, or Firm*—Woodard Emhardt Moriarty McNett & Henry LLP

(57) ABSTRACT

A customer at a client workstation communicates with access software on a remote server to retrieve data from a database. The client may obtain information, such as available inventory, the status of a pending order, and so on, without contacting the database owner, such as the distributor of the inventory. Reports can be generated automatically by the customer.

41 Claims, 14 Drawing Sheets

U.S. PATENT DOCUMENTS

| | | |
|---|---|---|
| 5,974,441 A | 10/1999 | Rogers et al. |
| 5,979,757 A | 11/1999 | Tracy et al. |
| 5,983,227 A | 11/1999 | Nazem et al. |
| 6,012,098 A | 1/2000 | Bayeh et al. |
| 6,014,630 A | 1/2000 | Jeacock et al. |
| 6,020,366 A | 2/2000 | Grube |
| 6,026,375 A | 2/2000 | Hall et al. |
| 6,029,143 A | 2/2000 | Mosher et al. |
| 6,049,711 A | 4/2000 | Ben-Yehezkel et al. |
| 6,052,631 A | 4/2000 | Busch et al. |
| 6,052,710 A | 4/2000 | Saliba et al. |
| 6,055,569 A | 4/2000 | O'Brien et al. |
| 6,065,043 A | 5/2000 | Domenikos et al. |
| 6,065,120 A | 5/2000 | Laursen et al. |
| 6,067,559 A | 5/2000 | Allard et al. |
| 6,070,149 A | 5/2000 | Tavor et al. |

OTHER PUBLICATIONS www.fcc.gov/cgb/consumerfacts/cellphonefraud.html.*
Studying customer evaluations of electronic commerce applications: a review and adaptation of the task-technology fit perspective; Wells et et al., .;System Sciences, 2003. Proceedings of the 36th Ann. Hawaii Int. Conf. on; Jan. 6-9, 2003 pp. 10 pp.*
Addressing location issues in mobile commerce; Varshney, U.; Local Computer Networks, 2001. Proceedings. LCN 2001. 26th Annual IEEE Conference on Nov. 14-16, 2001 pp. 184-192.*
Embedded databases can power emerging world of information to go; Shepard, S.J.; IT Professional; vol. 2, Issue 6, Nov.-Dec. 2000 pp. 10-13.*
U.S. Appl. No. 60/215,503, filed Jun. 30, 2000, Cleary et al.
U.S. Appl. No. 60/218,109, filed Jul. 13, 2000, Cleary et al.
U.S. Appl. No. 60/219,589, filed Jul. 20, 2000, Cleary et al.
U.S. Appl. No. 60/242,248, filed Oct. 20, 2000, Cleary et al.
Business Intelligence Documentation; CellStar Corporation; Oct. 20, 1999.

* cited by examiner ordering operations

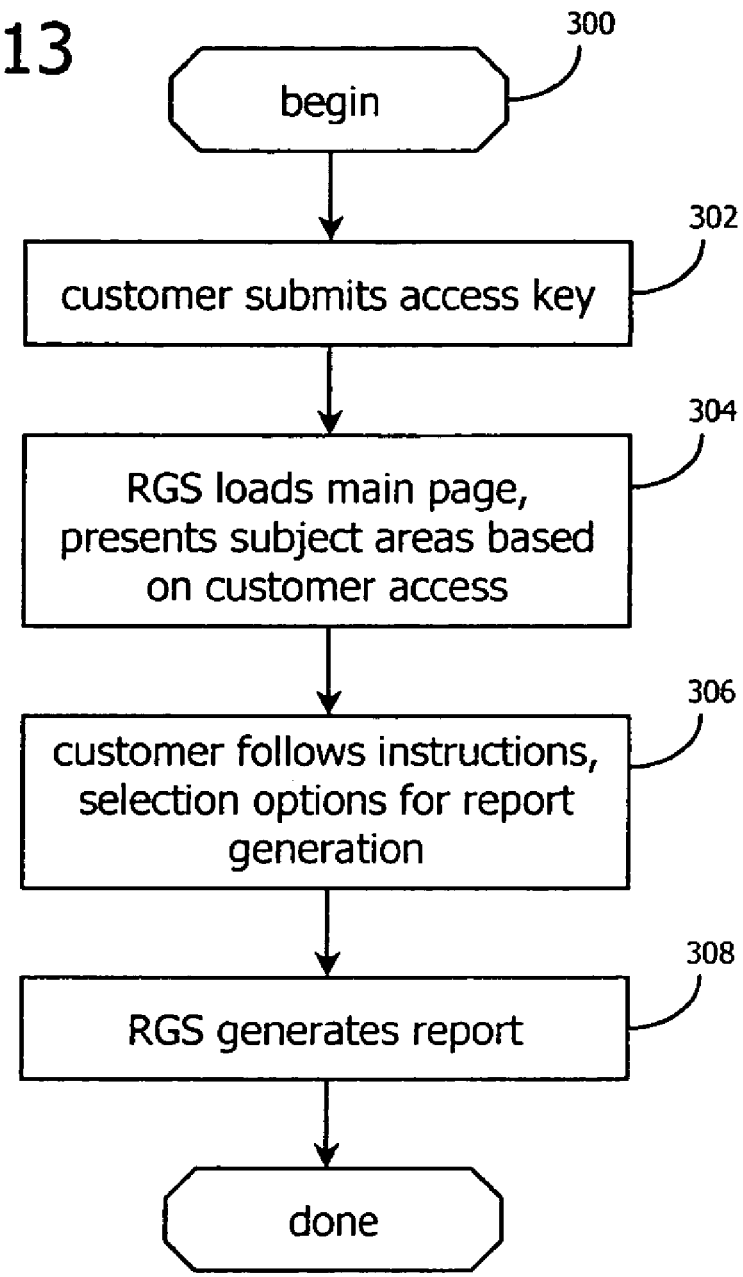

CUSTOMER-CONTROLLED INVENTORY ACCESS

BACKGROUND OF INVENTION

The present invention relates to inventory databases and, more particularly, to customer access to information about the inventory.

Businesses supplying products and services to customers may maintain distribution channels for fulfillment of product and service requests. Distributors may rely on retailers or other agents who ultimately interface with the customer. Often, the distributors maintain a database relating to the inventory or services being provided. The database may include customer information, inventory data, and the like. The distribution of wireless devices and accessories is typically provided by a manufacturer to a customer using distribution and/or fulfillment centers and retail interfaces. Wireless handset manufacturers may, for example, produce various models and brands of handsets for different wireless operating systems or protocols. The handsets are typically procured, stored, and kitted for shipment in a distribution or fulfillment center. The customer purchases wireless devices, accessories, and service through a carrier at a retail interface such as a retail outlet, or by telephone, facsimile transmission, mail order, Internet, and so on. The retail interface may involve carrier operations and/or third parties such as agents, dealers, resellers, or the like, who operate the retail outlet, or, in the case of telephone, facsimile, mail order, or Internet ordering, an order processing facility. Regardless of the fulfillment method, the relationship between the wireless communication customer and the carrier of wireless services starts with a service contract. The service contract enables the customer's wireless equipment to access a wireless transmission system, enabling the customer to send and receive calls, for example. The service contract also enables the carrier to bill and collect fees for use of the wireless system by the customer. A wireless telephone handset is associated with a unique identifier, such as an electronic serial number (ESN), usually assigned by the device manufacturer. A second unique identifier, such as a telephone number or mobile identification number (MIN), is assigned by the carrier for use in connection with the handset. The MIN is programmed or otherwise loaded into a memory of the handset. The carrier uses the ESN and the MIN to activate the wireless device for recognition by the carrier's wireless system. As online and remote services become more mainstream, customers, including retailers, continue to seek more efficient, seamless methods for purchasing inventory. Information sought may include the availability of inventory, the price of an item, and the status of an order. Business customers, in particular, need to be able to translate information regarding a purchase, available inventory, and so on, into a report. Not only do customers desire reports on demand, but also reports that are tailored to suit the particular business practices and needs of the customers. Distributors, likewise, hope to furnish customer report requests without expending resources inefficiently. To date, the distribution of information regarding available inventory, prices, and order status has been the responsibility of the distributors of the goods/services. The distributor may respond to a request for information from carriers, agents, retailers, resellers, dealers, and so on. Some distributors provide information via telephone, while others post selected information on a web site, or deliver messages by electronic mail (email), facsimile, or regular mail. Regardless of the method of dissemination, the distributors, at a great expense of time and resources, are the purveyors of the information regarding the orders, shipments, sales, and delivery of the goods/services, to the requester. Similarly, the distributors of goods/services are responsible for the receipt and acceptance of orders for the goods/services. Typically, standard order forms are generated or the orders are taken over the phone. Again, it is the distributor, not the requester, who expends the resources to receive and fulfill the orders. Current systems for ordering wireless communication products and services are time-consuming and inefficient. For example, in a typical transaction, a customer initially requests a wireless communication device through a carrier such as a retail outlet. The carrier receives the request and forwards the request to a distributor, such as a wireless communication distribution or fulfillment center. The distributor selects the requested device from the available inventory, optionally programs the handset with the MIN and kits the handset with the accessories, and ships the device to the customer, possibly through the carrier. Ultimately, both the carrier and the customer are "customers" of the distributor. Likewise, obtaining reports pertaining to the purchase of wireless communication products is typically cumbersome. For example, where a customer wishes to check on the shipping status of the wireless device, the customer contacts the carrier who contacts the distributor to make the request. The distributor processes the request, then sends a report back to the carrier, who submits the report to the customer. For a simple status report, several people may be involved. Even where the carrier seeks information from the distributor, without the involvement of any end customer, an inefficient expenditure of resources and time may occur. In any case, such reports are wholly in the control of the distributor, rather than the carrier or customer. The distributor, not the carrier, determines the timeliness, the format, and other characteristics of any information conveyed. Thus, there exists a need for a method and system that enables end user customers to place orders and access particular information, including reports, using the customer's resources.

SUMMARY OF INVENTION

In accordance with the embodiments described herein, a system is disclosed comprising a workstation accessible by a customer, a server coupled to the workstation, and a database coupled to the server. The server includes report generating software that receives an access key from the customer, sends a page, specifying one or more subject areas accessible to the customer, to the workstation, and generates a report based upon an election of one of the subject areas by the customer.

In a second embodiment, the server includes ordering software that receives an access key from the customer, determines that a portion of the database is accessible to the customer, and fulfills a customer request for data from the portion.

In a third embodiment, the server includes both the report generating software and the ordering software.

In one aspect, the present invention provides a system comprising a workstation accessible by a customer, a server coupled to the workstation, a database coupled to the server, and report generating software accessible through the server. The software is adapted to receive an access key from the customer, send a page to the workstation, wherein the page specifies one or more subject areas within the database to which the customer is permitted access, and generate a report based upon an election of one of the subject areas by the customer. The system can also include a browser on the workstation, wherein the access key is sent to the report generating software through the browser. The report is preferably generated in hypertext markup language. The report generating software preferably sends a customized page comprising one or more frames based upon the election of one of the subject areas by the customer. The one or more frames are preferably a query frame, a parameter frame, and a format frame.

In another aspect, the present invention provides a method comprising the steps of receiving an access request from a customer at a workstation, ascertaining rights to a database by the customer based upon the access request, and sending a report response to the workstation. The method can include receiving a request from the customer, wherein the request is submitted through the browser. The method can further include sending a frame to the workstation, the frame comprising a query, and sending a second frame to the workstation based upon a response to the query by the customer. The step of sending a frame to the workstation preferably includes producing a hyper-text markup language file of the frame, and transporting the hyper-text markup language file to a browser at the workstation.

A further aspect of the invention is an article comprising a medium storing instructions that enable a system to receive an access request from a customer at a workstation, ascertain rights to a database by the customer based upon the access request, and send a report response to the workstation. The article can further store instructions that enable a system to receive a request from the customer, wherein the request is produced on a browser. The article can further store instructions that enable a system to send a frame to the workstation, the frame comprising a query, and send a second frame to the workstation based upon a response to the query by the customer. The article can further store instructions that enable a system to produce a hyper-text markup language file of the frame, and transport the file to a browser on the workstation.

In another aspect of the invention, there is provided a system comprising a workstation accessible by a customer, a server coupled to the workstation, a database coupled to the server, and ordering software accessible through the server. The software receives an access key from the customer, determines that a portion of the database is accessible to the customer, and fulfills a customer request for data from the portion. The system can also include a first conduit for sending request packets from the workstation to the server, and a second conduit for sending response packets from the server to the workstation. The packets are preferably extensible markup language remote procedure calls. The ordering software can also send an electronic mail message to a predetermined electronic mail address in response to the customer request.

A further aspect of the invention is a method comprising the steps of receiving an access request from a customer at a workstation, ascertaining rights to a database by the customer based upon the access request, receiving a request from the customer, and sending a response to the customer. The step of receiving a request from the customer preferably includes receiving the request in an extensible markup language request packet. The step of receiving a request from the customer can include receiving a request for inventory information in the database. The step of sending a response to the customer can include sending an inventory response to the workstation, wherein the inventory response is embedded in an extensible markup language response packet. The step of receiving a request from the customer can also receiving a request for status of an order. The step of sending a response to the customer can include sending an order status response to the workstation, wherein the order status response is embedded in an extensible markup language response packet. The step of receiving a request from the customer can also include receiving a request to submit an order. The step of sending a response to the customer can also include sending an order submission response to the workstation, wherein the order submission response is embedded in an extensible markup language response packet.

A further aspect of the invention is the provision of an article comprising a medium storing instructions that enable a system to receive an access request from a customer at a workstation, ascertain rights to a database by the customer based upon the access request, receive a request from the customer; and send a response to the customer. The article preferably stores instructions that enable a system to receive the request in an extensible markup language request packet. The article can also store instructions that enable a system to receive a request for inventory information in the database. The article can also store instructions that enable a system to send an inventory response to the workstation, wherein the inventory response is embedded in an extensible markup language response packet. The article can also store instructions that enable a system to receive a request for status of an order. The article can also store instructions that enable a system to send an order status response to the workstation, wherein the order status response is embedded in an extensible markup language response packet. The article can also store instructions that enable a system to receive a request to submit an order. The article can also include instructions that enable a system to send an order submission response to the workstation, wherein the order submission response is embedded in an extensible markup language response packet.

A still further aspect of the invention is a system comprising a workstation accessible by a customer, a server coupled to the workstation, a database coupled to the server, report generating software accessible through the server, and ordering software accessible through the server. The report generating software receives an access key from the customer, sends a page to the workstation, wherein the page specifies one or more subject areas within the database to which the customer is permitted access, and generates a report based upon an election of one of the subject areas by the customer. The ordering software receives an access key from the customer, determines that a portion of the database is accessible to the customer, and fulfills a customer request for data from the portion.

BRIEF DESCRIPTION OF DRAWINGS

FIG. 13 is a flow diagram illustrating operation of the report generating software according to one embodiment of the invention.

DETAILED DESCRIPTION

In the following detailed description, embodiments are described as being used in connection with the purchase of wireless communication devices. The present invention is not, however, restricted to such use. Those skilled in the art recognize that the embodiments described herein may be used to advantage for any number of goods/services not limited strictly to wireless communication devices.

As used herein, the terms "client" and "customer" are used interchangeably to refer to the retailer, purchaser, and/or consumer seeking information regarding goods/services, or seeking to purchase goods/services. The term "distributor" refers to a wholesaler or other seller of goods/services.

In accordance with the embodiments described herein, a method and system for placing orders or requesting information by a customer are disclosed. In one embodiment, the method and system provide instant access to inventory, as needed by the customer, rather than when it is convenient for the distributor to provide the information.

System Features

Figure 1:
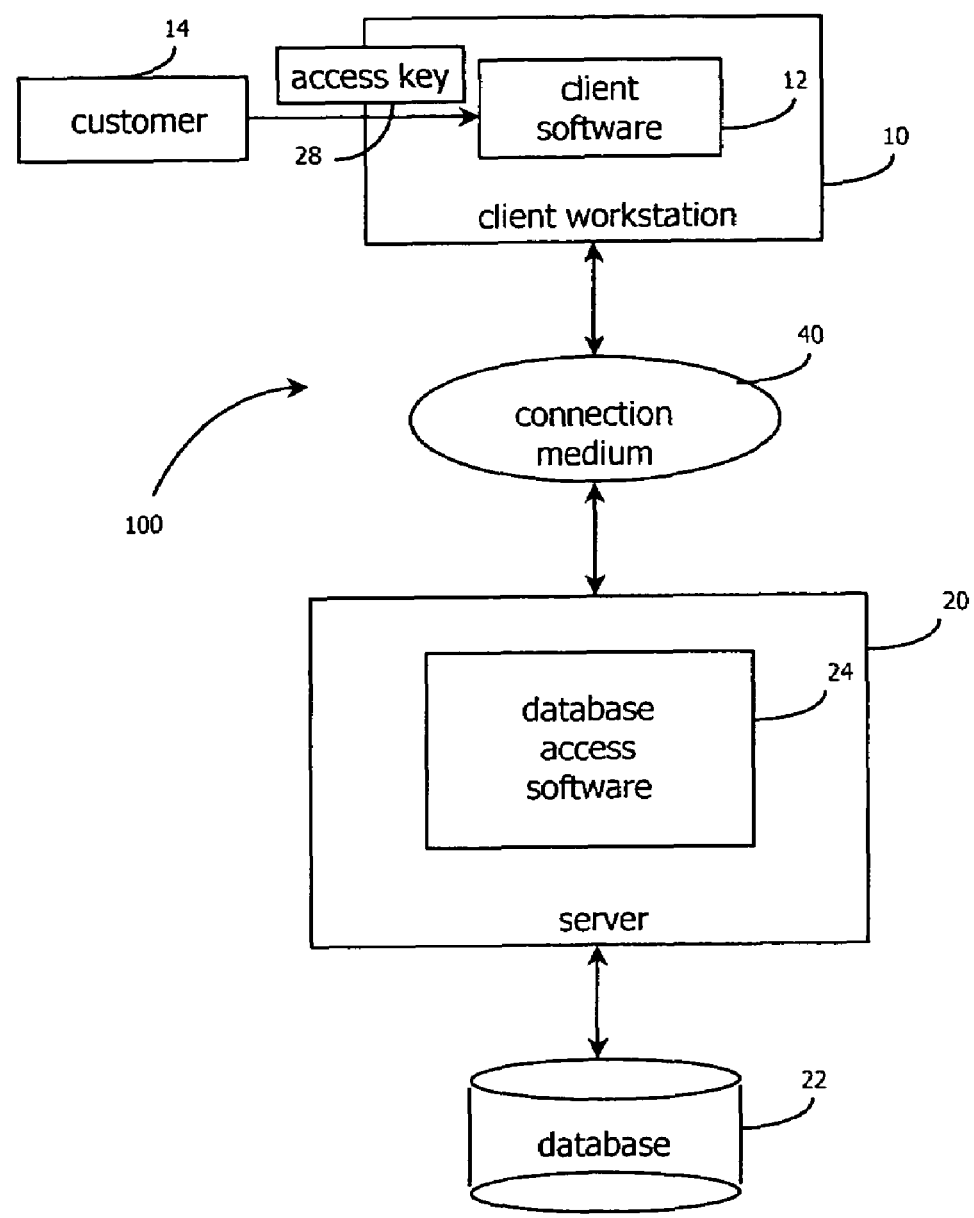
FIG. 1 is a block diagram of a system according to one embodiment of the invention.

FIG. 1 is a block diagram of a system 100, according to one embodiment of the invention, for fulfilling orders requested by customers from distributors, such as distributors of wireless communication devices. As depicted, the system 100 generally comprises a client workstation 10, accessible to a customer 14, with client software 12, and a server 20, on which database access software 24 resides.

Although a single customer 14 is depicted, the client workstation 10 may be accessible to a number of customers. Further, although a single client workstation 10 is depicted, multiple client workstations may access the server 20, as desired, for placing orders for fulfillment.

In one embodiment, the client workstation 10 is a processor-based system capable of executing the client software 12. The client workstation 10 is coupled to the server 20 through a connection medium 40. In one embodiment, the connection medium is a network, such as the Internet. The connection medium 40 may include a modem, network interface card, a satellite system, a cable system, or Intranet connection, or other medium for coupling the client workstation 10 to the server 20.

The server 20 is coupled to a database 22 comprising information pertinent to the ordering operation being performed by the customer. The database 22 may be a non-volatile storage medium, such as a hard disk drive, compact disk read-only memory (CD ROM), an optical storage device, a digital video disk (DVD) medium, or other non-volatile storage.

The database 22 stores numerous records regarding particular stores of information. These stores of information may include, but are not limited to, inventory, prices, shipping methods, delivery dates, and so on. Additionally, customer, ESN and MIN information may be stored in the database 22.

One type of customer information, as shown in FIG. 1, is an access key 28. The access key 28 enables access to the database 22 through the client software 12. In one embodiment, the access key 28 comprises multiple elements, such as a membership identifier (ID), such as for a business, and a password, such as for an agent within the business. The database 22 may store the access key 28 for all customers who desire access to the database 22.

Further, in some embodiments, an additional unique identifier is retrieved for a specific customer 14. The unique identifier is generated during installation of the client software 12. The membership ID and/or password, as well as the unique identifier, are encrypted by the client software 12, transmitted to the server 20, and translated by the server upon receipt.

Figure 2:
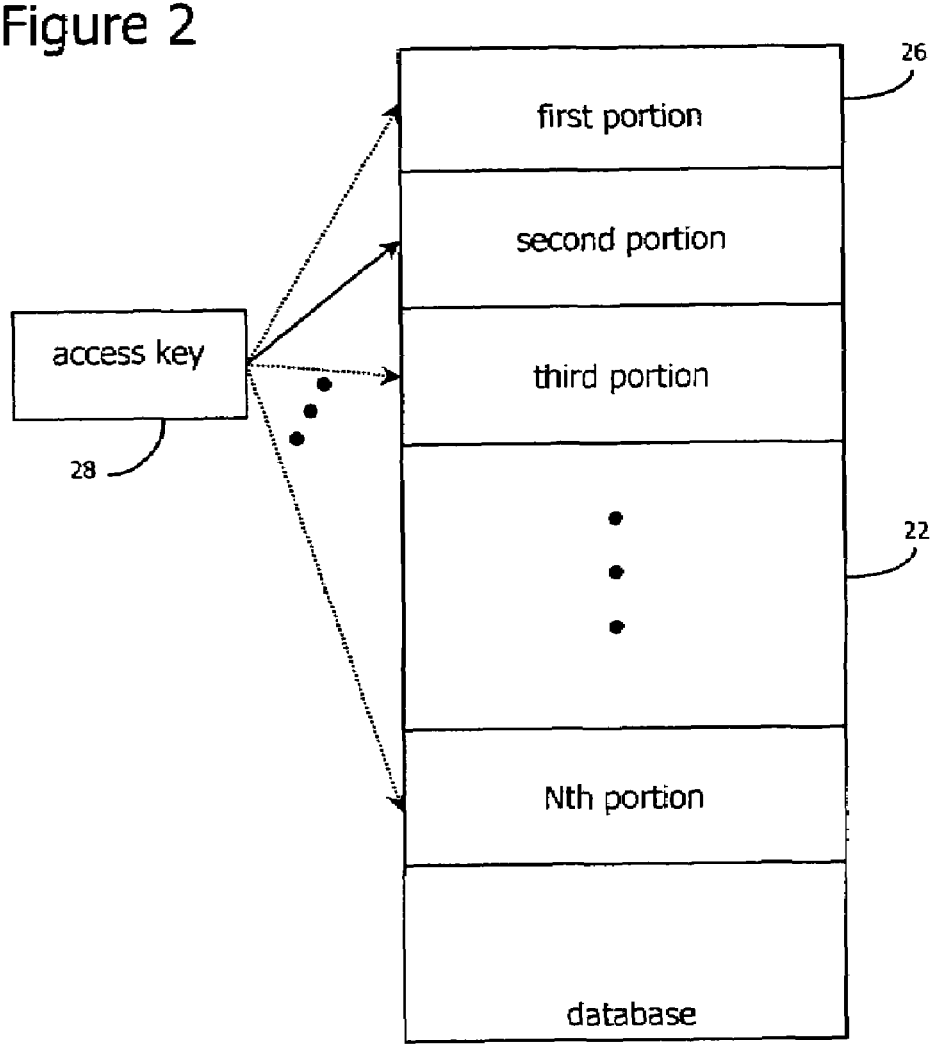
FIG. 2 is a block diagram illustrating operation of the access key according to one embodiment of the invention.
Figure 3:
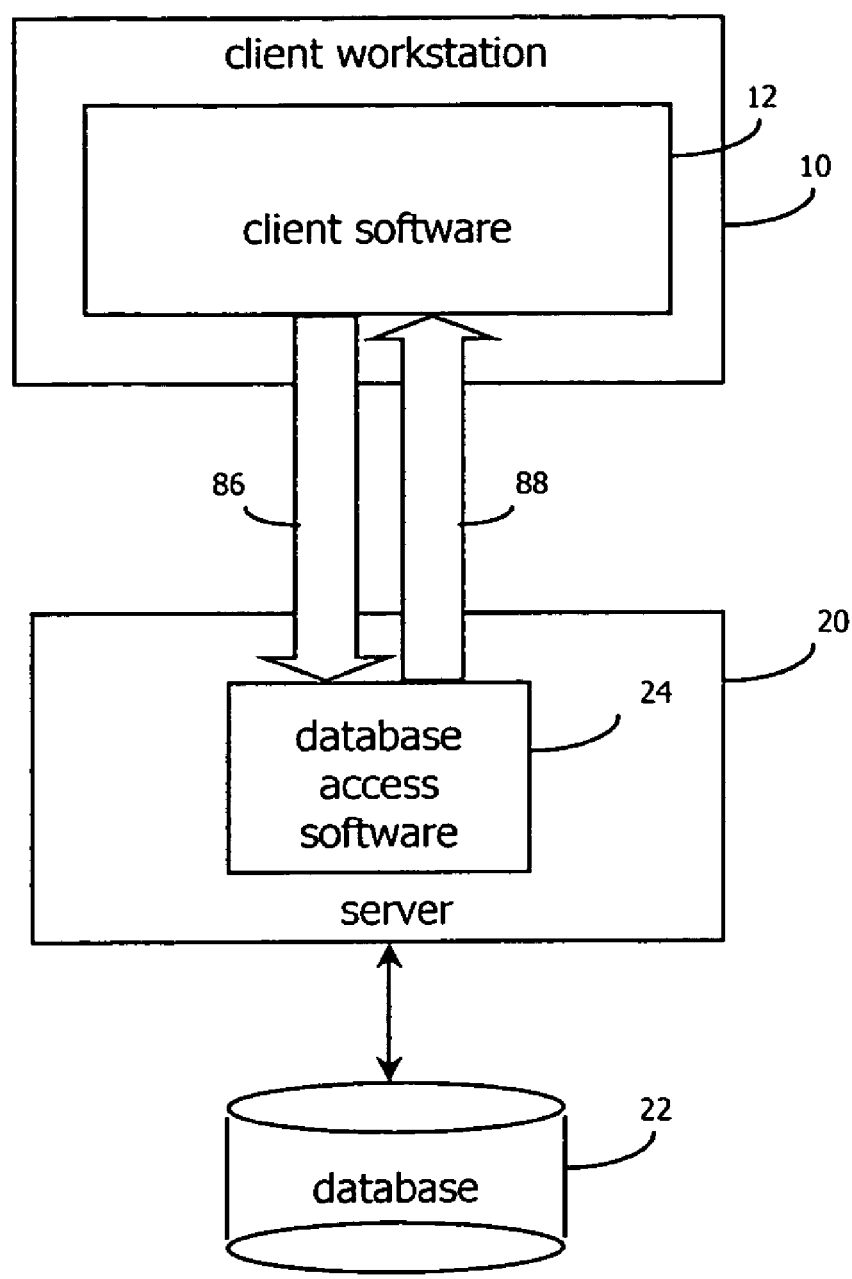
FIG. 3 is a detailed block diagram of the database access software as implemented according to one embodiment of the invention.

In one embodiment, the access key 28 provides access to particular stored information within the database 22. For example, in FIG. 2, the database 22 includes distinct portions 26. Each portion 26 may include a different type of data, such as inventory, customers, sales figures, and so on. Alternatively, each portion 26 may include all data related to a different customer, such that each customer 26 accesses a single portion 26. The accessible portion may, for example, include a catalog or list of products available to the customer 14.

The Software

In one embodiment, the system 100 enables the customer 14 to access the database 22, or portions thereof, through the client software 12. In one embodiment, the client software 12 uses extensible markup language (XML) to communicate with the database access software 24 of the server 20.

Extensible markup language (XML) technology provides access to a remote system from any hyper-text transfer protocol (HTTP)-enabled application. XML-RPC (remote procedure call) technology is a specification and a set of implementations that allow software running on disparate operating systems, running in different environments, to communicate over the Internet. XML technology enables complex data structures to be transmitted, processed, and returned using simple remote procedure calls.

In one embodiment, the client software 12 is an HTTP-enabled application, such as an XML-RPC program, that transmits procedure calls to the server 20. XML technology enables the client workstation 10 to communicate with the database access software 24 across a wide variety of platforms.

In another embodiment, the client software 12 includes a web browser, for retrieving information from the server 20. Web browsers enable HTML-scripted web pages to be displayed on the client workstation 10. The web browser is used by the report generation software 34 to present graphical displays to the customer 14.

The client workstation 10 and the server 20 may vary by computer type, device type, and so on. All such platform discrepancies are filtered by the XML-ready client software 12, as the software receives and encodes customer requests. The same is true for web browsers, which operate on a variety of platforms, and which access HTML-scripted files from servers on a network.

The system 100 generally depicts the client workstation 10 and the server 10 linked through interfaces 86 and 88. The database access software 24 and the client software 12 communicate through these interfaces. Communication may occur using a variety of protocols.

Figure 4:
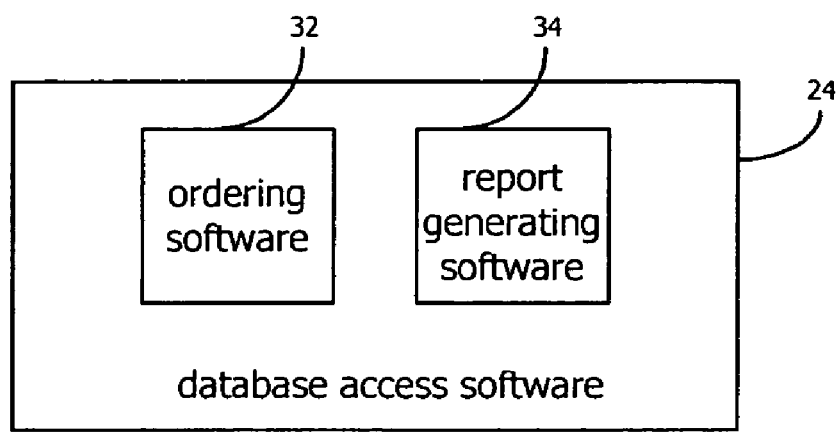
FIG. 4 is a functional block diagram of the database access software according to one embodiment of the invention.

In one embodiment, the database access software 24 comprises two functions, an ordering function and a report generating function. In FIG. 4, for example, the database access software 24 comprises ordering software 34 and report generating software 36, known hereinafter as RGS 36. Although the ordering software 34 and RGS 36 are discussed separately, they may be integrated into a single software program, in some embodiments.

The ordering software 34 enables the customer 14 to obtain status information regarding a pending order, inventory information for a potential order, or other data from the database 22. The RGS 36 enables the customer 14 to request reports from the database 22.

Obtaining Order Information

Figure 5:
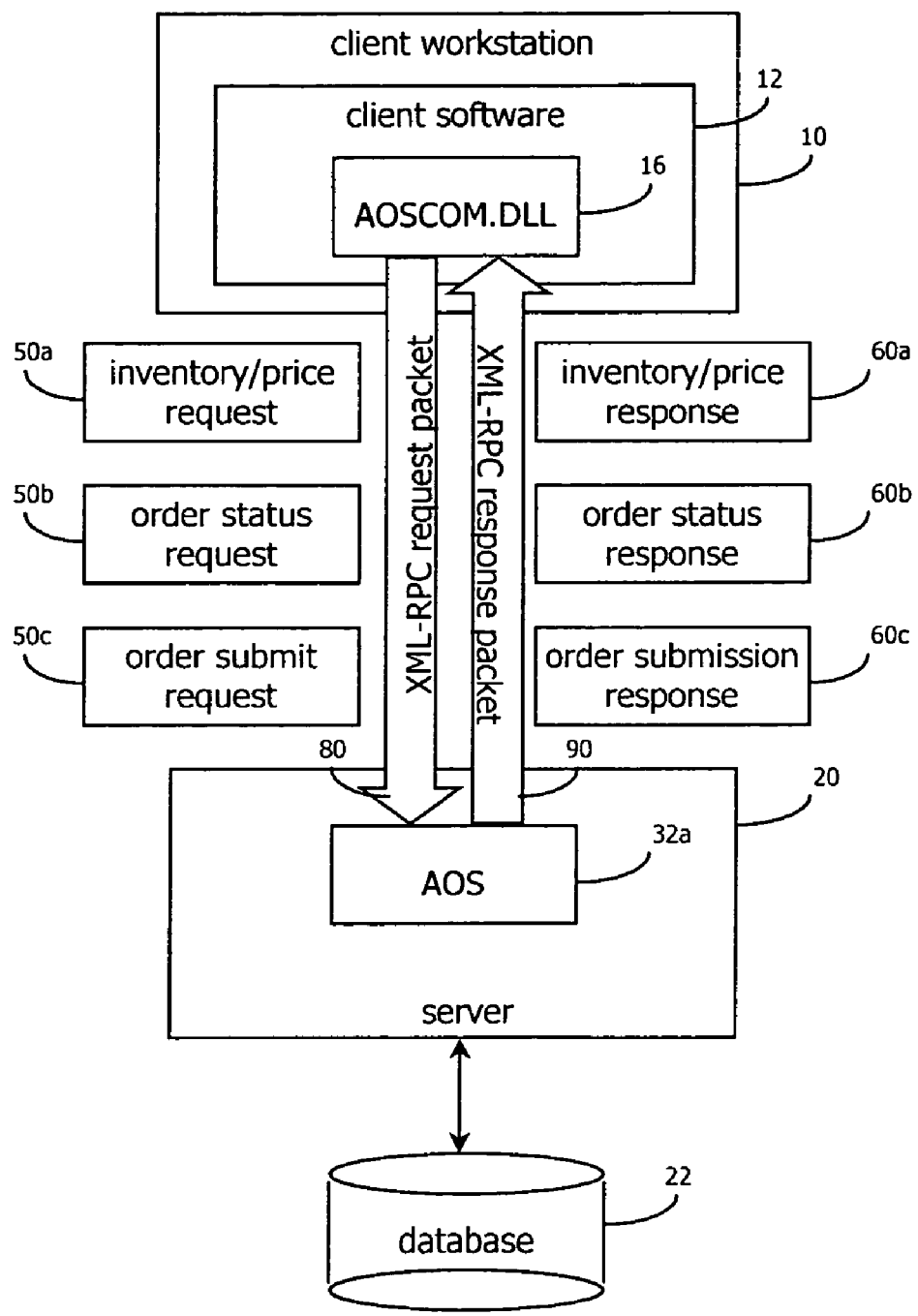
FIG. 5 is a block diagram of the ordering software implemented according to one embodiment of the invention.

As depicted in FIG. 5, the system 100 includes conduits between the client workstation 10 and the server 20. A first conduit travels from the client workstation 10 to the server 20 and contains an XML-RPC request packet 80. A second conduit travels back from the server 20 to the client workstation 10 and contains an XML-RPC response packet 90. The XML-RPC response packet embeds result information, such as a response to an inventory request, a status report, and so on. Both the request 80 and the response 90 are XML-encoded using universally understood programming scripts. In one embodiment, the request 80 and the response 90 use the Internet as a transport.

In one embodiment, the ordering software 32 is CellStar Advanced Ordering Software® (AOS), a product of CellStar, Ltd., of Carrollton, Tex. As illustrated in FIG. 5, AOS 34a receives XML requests and responds to the requests in the XML format. Because XML is a widely known scripting language used for Internet-based applications, using AOS on the server 20 enables customers 14 from any client workstation 10 that has Internet access the ability to perform ordering operations using the XML language. Upon receiving the contents of the XML-RPC request packet 80, AOS 34a receives, translates, and executes access requests from the client workstation.

To interface with AOS, the client workstation 10 includes a component known as AOSCOM.DLL, according to one embodiment. AOSCOM.DLL 16 is the XML component object module (COM) component of the client software 12. AOSCOM.DLL allows the customer 14 to request information by setting values and invoking methods. AOSCOM.DLL is language-independent, allowing it to work in any programming environment that supports COM components. AOSCOM.DLL is also an in-process component, allowing for quick communication, in some embodiments.

Once a method is called and the appropriate variables have been passed, AOSCOM.DLL uses the variable parameters to build an XML data stream. In one embodiment, the data stream is embedded in an XML-RPC request packet, as illustrated in FIG. 5. AOSCOM.DLL 16 then posts the stream to the server 20.

The XML stream is posted to the server 20 by including a uniform resource locator, or URL, in one embodiment. At the server 20, AOS 16 receives the request embedded in the XML stream, accesses the database 22, limited by any access restrictions defined by the access key 28, and builds a response stream.

In one embodiment, the client software 12 may invoke one of three methods 50 to AOS 32a: inventory/price request 50a, order status 50b, or order submit 50c. Likewise, the AOS 32a sends one of three responses 60 to AOSCOM.DLL 16: inventory/price response 60a, order status response 60b, or order submission response 60c. In one embodiment, the responses 60 are embedded in XML-RPC response packets, as depicted in FIG. 5.

Figure 6:
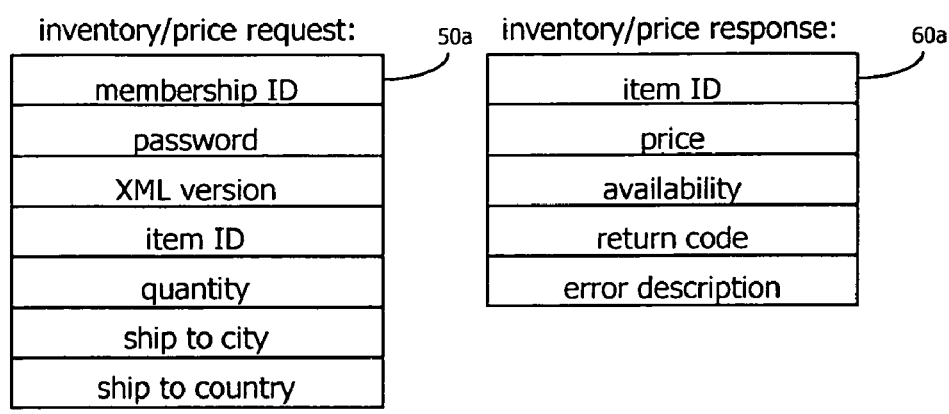
FIG. 6 is a block diagram of parameters used for inventory/price request and response according to one embodiment of the invention.
Figure 7:
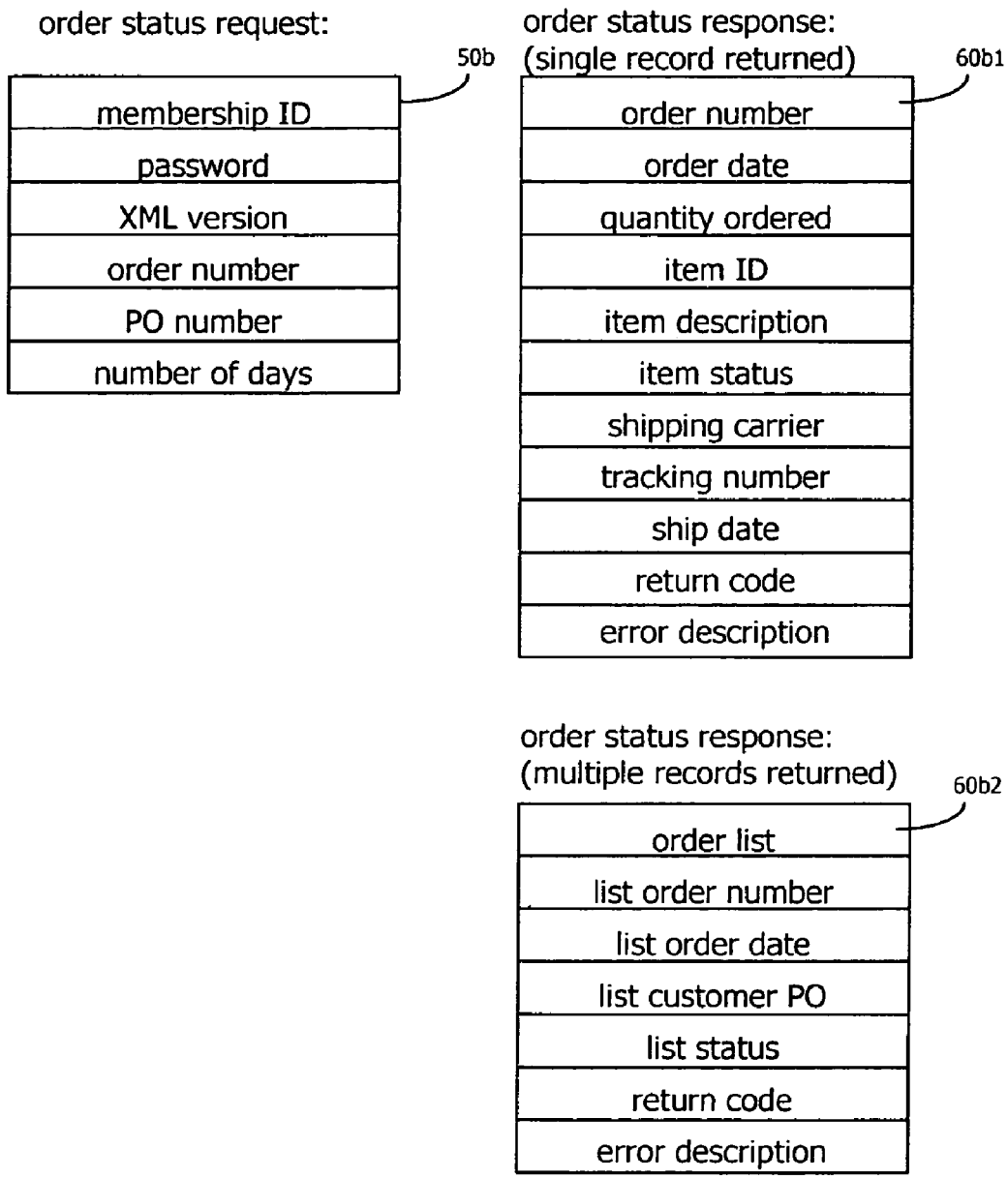
FIG. 7 is a block diagram of parameters used for order status request and response according to one embodiment of the invention.
Figure 8:
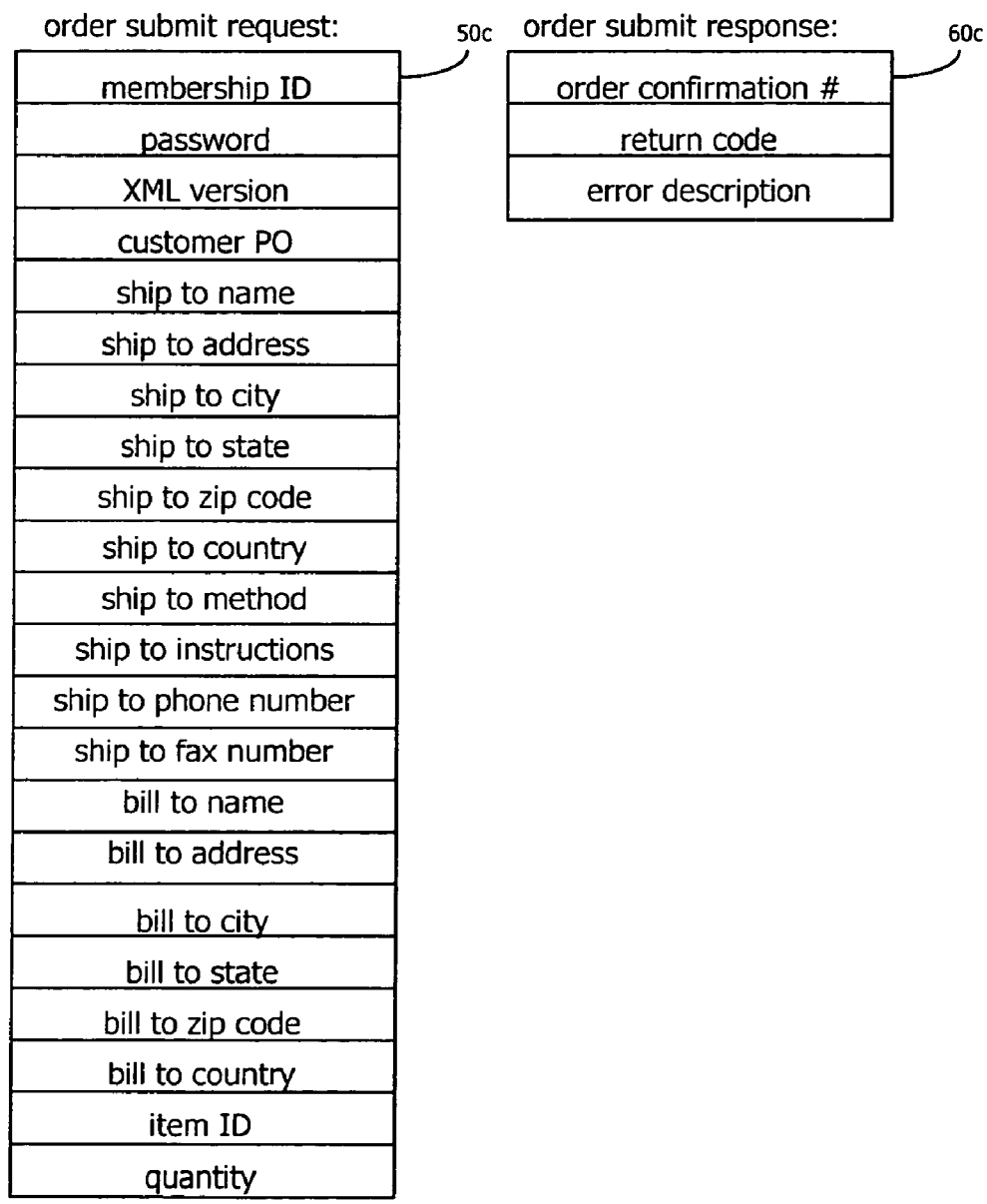
FIG. 8 is a block diagram of parameters used for order submit request and response according to one embodiment of the invention.

Methods 50 and responses 60, according to one embodiment, are depicted in FIGS. 6, 7, and 8. FIG. 6 represents an inventory/price request method 50a and an inventory/price response 60a. FIG. 7 represents an order status method 50b and an order status response 60b. FIG. 8 represents an order submit method 50c and an order submit response 60c.

For each method 50, relevant variables 70 for performing the method are defined. In one embodiment, these variables 70 are provided when the method 50 is invoked. The variables 70 may include descriptive information about the inventory, information about the customer, and so on. For example, the inventory/price request method 50a includes an item ID, a quantity, and two customer variables, "ship to city" and "ship to country." In one embodiment, each method 50 includes variables 70 for submitting the access key 28 or its components, such as a membership ID, a password, a unique identifier, and so on. These variables neither pertain to the customer nor the inventory, but to access to the database 22, e.g., the security of the system 100. Also, in some embodiments, the XML version is passed to the methods 50, for ensuring proper communication between the client software 12 and the AOS 32a.

Since the responses 60 only follow the methods 50, (and are sent by the server 20), the responses 60 do not include security variables such as the membership ID and the password. Instead, in one embodiment, the responses 60 include variables 70 which answer the inquiry for which the method 50 is invoked. For example, the inventory/price response 60b includes item ID, price, and availability variables. The item ID variable is a restatement of the item ID variable in the inventory/price request method 60a, but the price and availability variables result from a search of the database 22 for information about the item identified.

The number of variables 70 may vary. For example, in FIG. 7, the order status request method 50b requires few variables to be sent in order for AOS to execute. The order status response 60b, in contrast, includes many variables 70. In one embodiment, the system 100 supports two order status responses, a first 60b1, in which a single record is returned, and a second 60b2, in which multiple records are returned. In contrast, in FIG. 8, the order submit request method 50c includes many variables, in one embodiment, while the order submit response 60c includes very few.

In one embodiment, each of the responses include a return code variable and an error description variable. The return code can include a status code, such as to indicate the method that was invoked, or may include a code to indicate failure of the method. In one embodiment, the return code is "1" when the method was successfully completed, or "0" if the method failed.

The error description can more specifically indicate the nature of a method failure. For example, errors can be sent to indicate that a variable entry was omitted, the membership ID or password is incorrect, an error occurred while parsing the XML data stream, and so on. Programmers of ordinary skill in the art will recognize a variety of ways in which error and return codes can be used, and the possible error messages that can be sent are virtually limitless.

The variables 70 can be of differing types, in one embodiment. For example, the variables 70 can be typed as data, integer, Boolean, floating, array, and so on. In one embodiment, the type for each variable is specified in a document type definition (DTD). The DTD explains every data element in an XML data stream. In one embodiment, the length of each variable 70 may also be defined in the DTD.

For the request to be successful, the method 50 follows the structure defined in its DTD, according to one embodiment. The response 60 follows a separate DTD that promises a consistent format for the response, regardless of the information being submitted, including erroneous or incomplete information.

When the response is received, in one embodiment, AOSCOM.DLL pulls the values from the response stream and sends the variables to the client software 12.

In one embodiment, the client software 12 is a web browser capable of presenting the response data in graphical form to a video display. The client workstation 10 includes an XML parser program, such as Microsoft XML Parser 2.0, a product of Microsoft Corporation, of Redmond, Oreg.

The methods, responses, and variables of FIGS. 6, 7, and 8 are illustrative only. The system 100 may be customized for the type of business, the inventory, the geography of the customers, and so on. For example, in the illustrated order status response 60b1 (FIG. 7), shipping carrier variable is supplied, such as to benefit international customers. In some embodiments, the order submit request method includes additional variables 70, not shown in FIG. 8, for address information, facilitating some businesses that maintain multiple addresses.

In one embodiment, the customer 14 or the client workstation 10 supplies an XML software version variable within its methods. The XML version variable enables the ordering software 24 to provide efficient and consistent translations from the client software 12. Those of skill in the art recognize that the security of the database 22 within the system 100 may be maintained in many ways.

Figure 9:
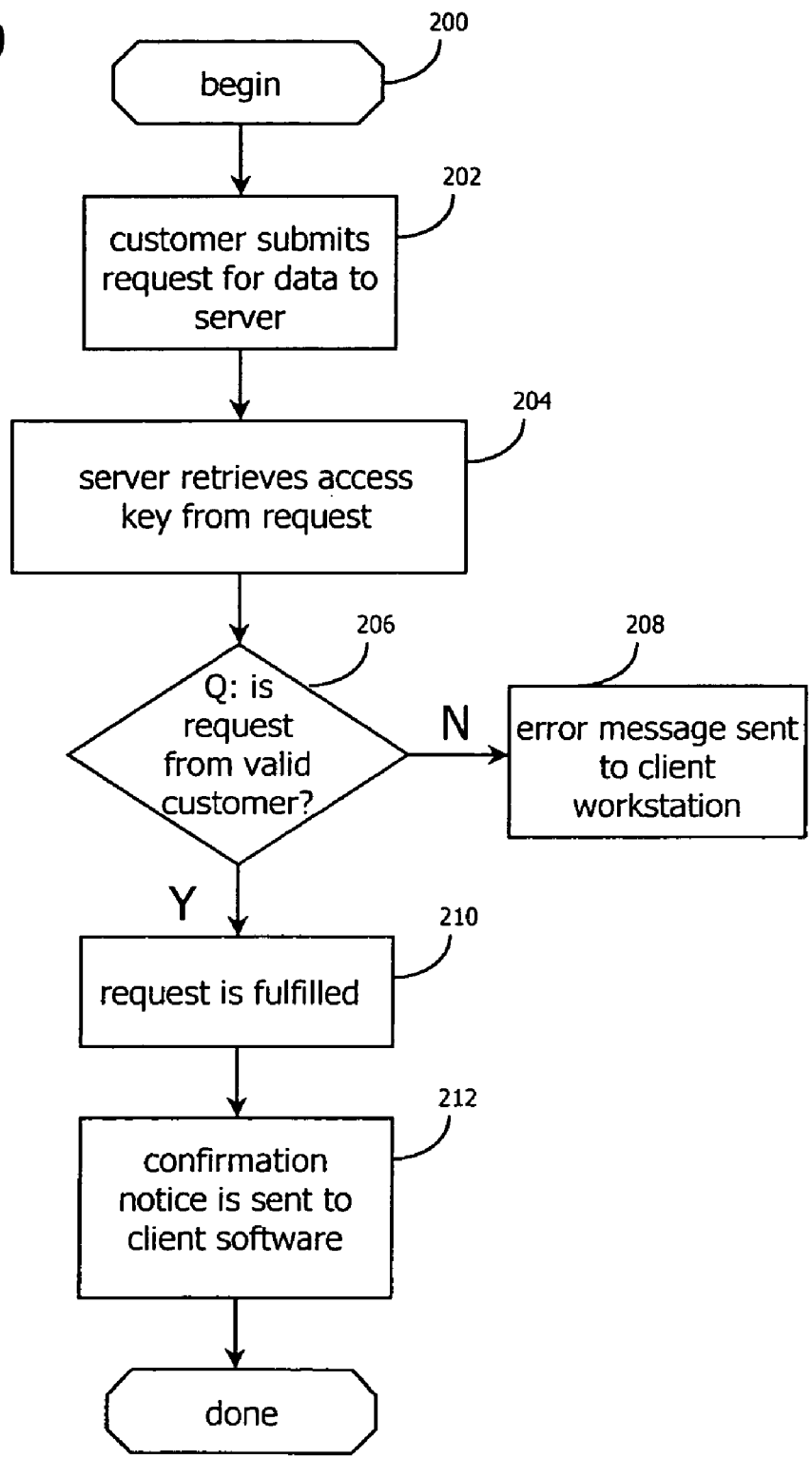
FIG. 9 is a flow diagram illustrating operation of the ordering system according to one embodiment of the invention.

FIG. 9 is a flow diagram of the process for fulfilling order and status requests in the system 100, according to one embodiment. Initially, the client workstation 10, through the client software 12, submits a request to the ordering software 32 on the server 20 (block 202). The transmitted request may be for information or for execution of a request.

For example, the customer 14 may request information about the availability and price of a specific item, such as a cellular phone. Similarly, the customer 14 may submit an actual order for the item. Additionally, the customer 14 may request status of a pending order or obtain other information, such as shipping date. One skilled in the art will recognize that the above list of requests is exemplary and not intended to be exhaustive.

In one embodiment, the transmitted request includes the access key 28 which is encrypted. The server 20 extracts the access key 28 (block 204), and validates it (diamond 206). If not valid, the server 20 responds to the client workstation 10 with an error message (block 208).

If valid, however, the ordering software 32 accesses the database 22 in order to fulfill the request (block 210). The request may be, for example, a request for information about the availability of wireless devices or inventory. The ordering software 32 searches the database 22, or that portion of the database 22 that is accessible based upon the access key 28 (see FIG. 2), for the requested inventory.

If, instead, the request is for the placement of an order for a wireless device, the ordering software 24 places the order to be filled, including the shipping address, phone number, and fax number. Additionally, in one embodiment, the ordering software 24 may inform the customer 14 about alternative products that may be interchangeable with out-of-stock items, upgradable products, compatible accessories, and so on.

Where the request has been completed by the ordering software 24, the software 32 responds to the client workstation 10 with a confirmation (block 212). Where status information was requested by the client workstation 10, such information is supplied along with the confirmation, in one embodiment.

If the order cannot be filled, an error message is transmitted to the client workstation 10, in one embodiment, detailing the reason for the failure. In addition to the error messages already discussed, messages may be transmitted to the customer 14 regarding inventory, price requests, order status, substitute inventory, and so on.

In one embodiment, the system 100 is further configured for automatic email notification. The ordering software 32 can receive and store multiple email addresses, for example, and can further be configured to determine the recipient, whether customer 14 or client workstation 10, of particular types of information.

For example, if the customer 14 has ordered a cellular device through the client workstation 10, in addition to placing the order to be filled and sending a confirmation notice to the client workstation 10, the ordering software 32 may automatically send an email detailing the transaction, e.g. MIN and ESN, to the cellular service provider.

Accordingly, the customer 14 can tailor the client software 12 to request the exact information desired. Such information is limited only by restrictions to the database 22 that are implemented by the above-described security features.

In one embodiment, the ordering software 24 supports multiple languages and multiple currencies, such as may be preferred by overseas customers. Such flexibility may be exploited by certain customer bases or for certain inventory, such as satellite or satellite-cellular mixed mode phones.

In the above descriptions, XML-RPC requests and responses act as transports between the client workstation 10 and the server 20. XML-RPC is an XML application that specifies a fairly simple way to format XML payloads to facilitate remote procedure calls using the HTTP protocol. There are three basic payloads that may be transmitted between the client workstation 10 and the server 20.

First, a MethodCall payload may be posted to the server 20, including information about which method to invoke and any parameters that are to be passed to the method. The method call payload starts with an XML indicator, which informs the receiving software that the text following is XML. The rest of the payload explains that a method call is being performed, gives the method name, parameters, and data types of the parameters.

A second payload is one of two possible responses that the server 20 may generate. A MethodResponse payload returns values that the specified MethodCall produced to the server 20. The MethodResponse payload includes an XML indicator, method response indicator, and values stored in a single parameter tag.

A third payload, FaultResponse, is used to indicate an error returned by the server 20. The FaultResponse payload provides an XML indicator, a fault indicator, and a single structure with two members, a fault code and a description. Programmers of ordinary skill will recognize the various XML-formatted payloads.

The above-described XML payloads may be used across the HTTP protocol, providing the means necessary to perform remote procedure calls through firewalls and over the Internet. A more extensive XML-RPC description may be found at www.xmlrpc.com. XML-RPC may be preferred, in some embodiments, by offering customers great extensibility to retrieve data based upon customer, not distributor, preferences.

Obtaining ReportsReturning to FIG. 4, the database access software also includes the RGS 34, according to one embodiment. The RGS 34, or report generating software, enables the customer 14 to build a variety of reports based upon specific criteria fed to the RGS 34 by the customer 14.

Figure 10:
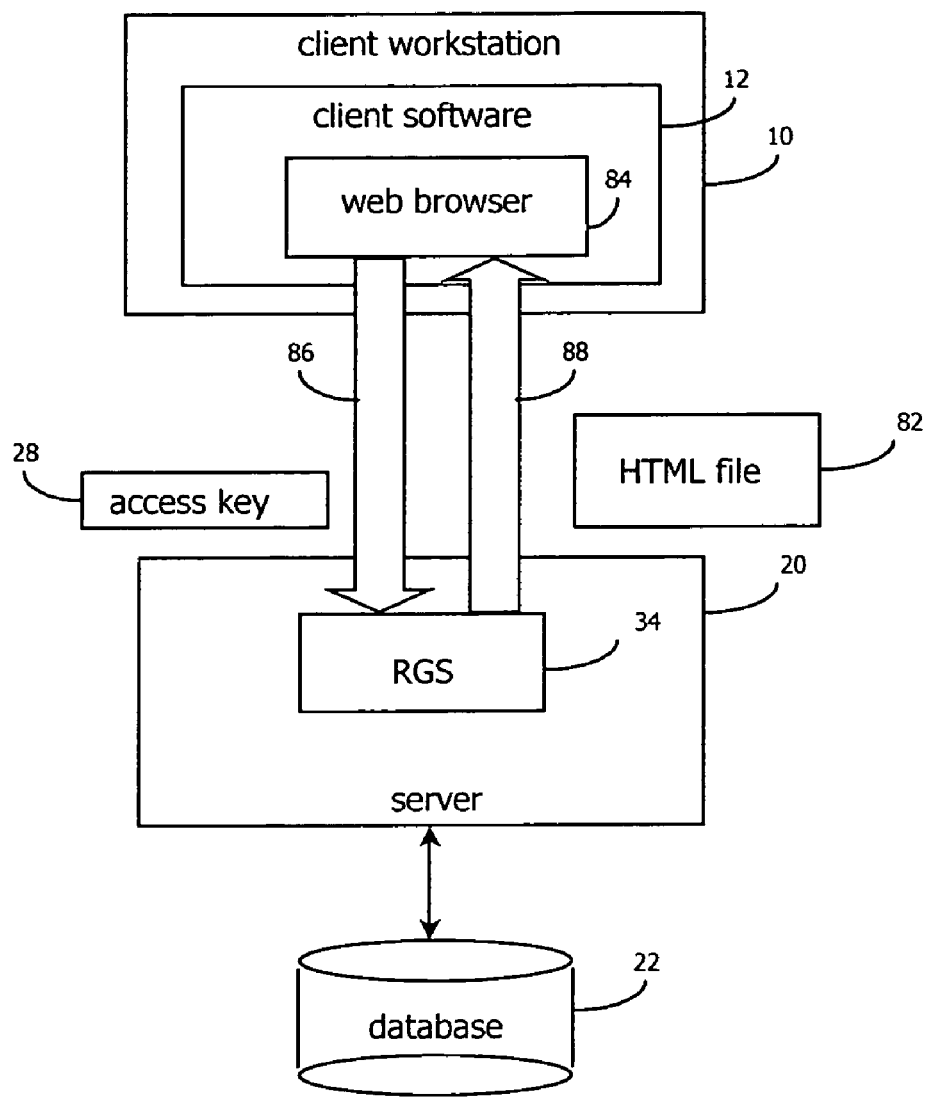
FIG. 10 is a block diagram of the report generating software according to one embodiment of the invention.

In FIG. 10, the RGS interfaces with the client software 12 to provide one or more reports to the client workstation 10. In one embodiment, the client software 12 includes a web browser 84 that receives files using hyper-text markup language and presents the files in graphical form, e.g., as a web page, to a display (not shown) on the client workstation 10. Web browsers communicate with servers using well-established protocols, familiar to those of ordinary skill in the art.

The RGS 34 may be loaded into a memory (not shown) of the server 20, or into the memory of a device accessible to the server 20. In one embodiment, the RGS presents HTML-scripted files to the web browser 84 such that a graphical image may be displayed by the client workstation 10.

Once a link is established between the client workstation 10 and the server 20, the customer 14 instructs the server 20, through the web browser 84, to access the RGS 34. Such instruction may be provided using methods known in the art including, but not limited to, selecting a web page or a pre-configured access button, either of which may be provided by the client software 12.

In one embodiment, a customer 14 accesses the RGS 34 by supplying the access key 28 to the server 20. The access key 28 may include unique identifiers such as a membership ID or a password. Or, the access key may include wireless device identifiers, such as the electronic serial number (ESN) or the mobile identification number (MIN) to grant access.

The RGS 34 also may determine an access level to the database, in one embodiment. The access level may determine both the subject areas on the database 22 accessible to the customer 14 and access to features of the RGS 34 itself.

For example, the customer 14 may have access to all records pertaining to the customer's individually placed order while being restricted from accessing any records pertaining to other similarly placed orders. In other words, the customer 14 may be restricted to the subject area for a single ESN. In contrast, a manufacturer may have access to the inventory of a distributor, but be restricted from accessing ESNs and/or MINs.

Once the RGS 34 is accessed, a HTML file 82 is transmitted back to the browser 84. The contents of the HTML file 82 will be displayed in a GUI format by the browser 84. For example, the first HTML file 82 sent to the client workstation 10 may be an initial "welcome" GUI, that prompts the customer 14 for further action.

Figure 11:
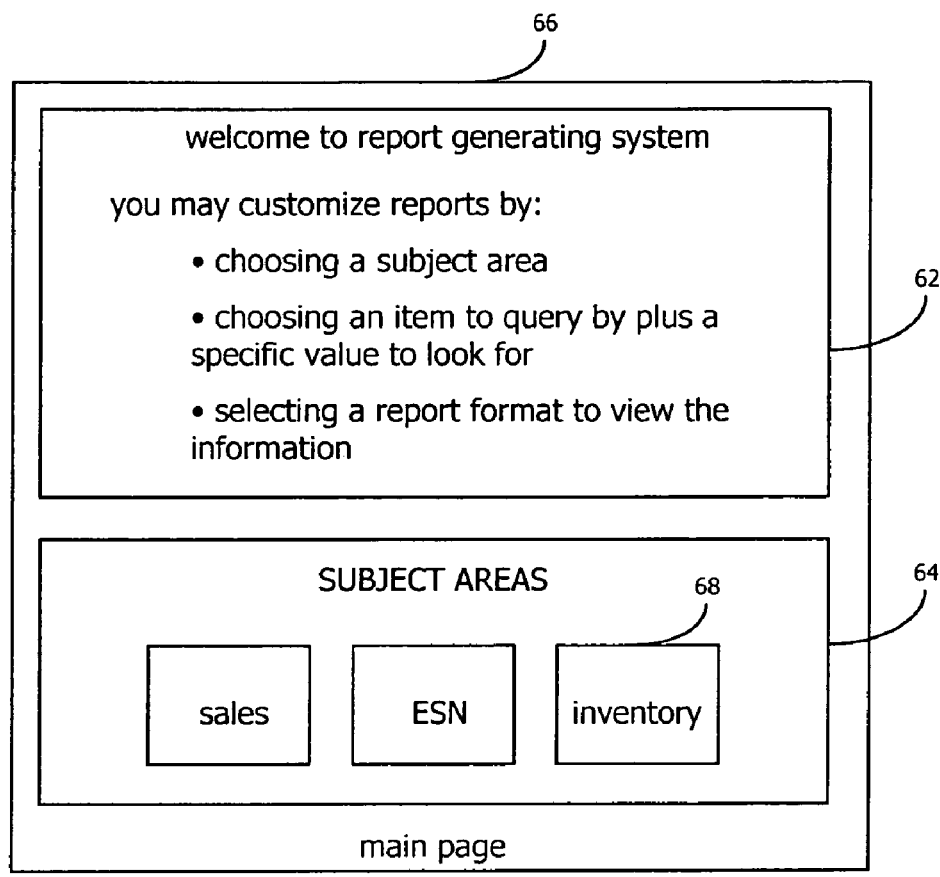
FIG. 11 is a diagram of a main page of the report generating software according to one embodiment of the invention.

In one embodiment, a main page 66 is presented by the RGS 34. The main page 66 is depicted in FIG. 11. The main page 66 includes an instruction frame 62 and a subject area frame 64. The instruction frame 62 provides the customer 14 with general instructions regarding use of the RGS 34.

The subject area frame 64 displays various subject areas 68 available to the customer 14. Which subject areas 68 are displayed can, for example, be based upon the access key 28 received by the RGS 34. If the customer information is erroneous or otherwise not verified by the RGS 34, an error message is transmitted to the client workstation 10, in one embodiment.

The subject areas 68 include, but are not limited to, areas such as electronic serial numbers (ESN), inventory, and product descriptions, for example. Where a subject area 68 is not available to the customer 14, the subject area 68 is not displayed on the main page 66.

Figure 12A:
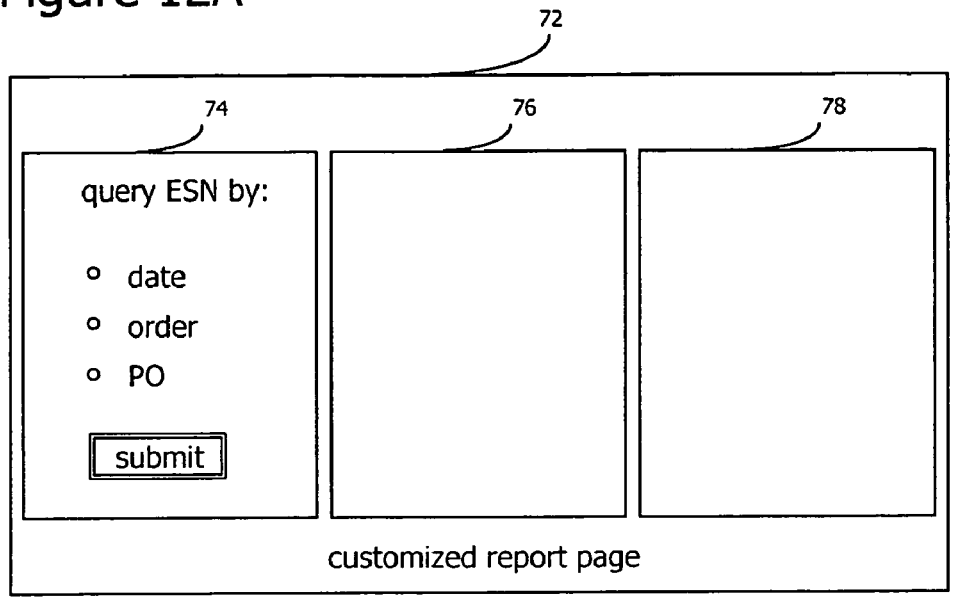
FIGS. 12A, 12B and 12C are diagrams of a customized report page of the report generating software according to one embodiment of the invention.

Once a subject area 68 is selected, a customized report page 72 is displayed, as depicted in FIG. 12A. As with the main page 66, the customized report page 72 is in GUI format. In one embodiment, the customized report page 72 includes three frames: a query frame 74, a parameter frame 76, and a format frame 78. The three frames may depend upon each other, in one embodiment. For purposes of illustration and not for limitation, the three frames 74, 76, and 78 are described with regard to selection of the ESN subject area 68.

In one embodiment, the query frame 74 of the ESN subject area provides the customer 14 with the option of creating an ESN report based upon the shipping date, order number, or purchase order number of the subject inventory. The available options are depicted in FIG. 12A. In one embodiment, parameter and format frames 76 and 78 remain empty until a selection is made in the query frame 74.

Figure 12B:
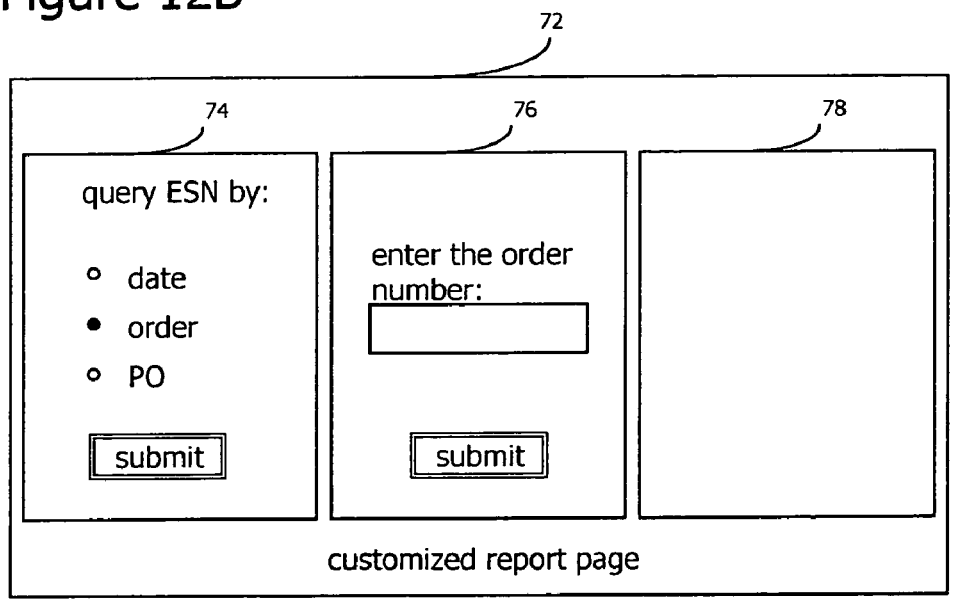

In the query frame 74, a list is displayed as option buttons "date," "order," and "PO" (see FIG. 12B). Each subject area 68 has as many plans as the number of desired queries. For example, the ESN subject area includes three types of queries, supported by three separate plans (ship date, order number, and PO number). Once the customer chooses a query, a plan name is stored in a session variable and is also passed on to the next frame, the parameter frame 76.

In FIG. 12B, the customer has elected to query the ESN subject area 68 by order number. Accordingly, the parameter frame 76 provides an input box, allowing the customer to enter an order number. Similarly, if the customer chooses to create a report based on shipping dates, the parameter frame 76 prompts the use with an input box for supplying such dates. After the parameter is entered, here the order number, the RGS 34 searches the database 22 for the requested data.

Where the "date" election is instead made in the query frame 74, a "date" prompt will appear in the parameter frame 76, allowing the customer to insert a date or, alternatively, select from a list or range of dates. As the customer enters a date, the date is stored in a session variable and sent to the format frame 78.

Figure 12C:
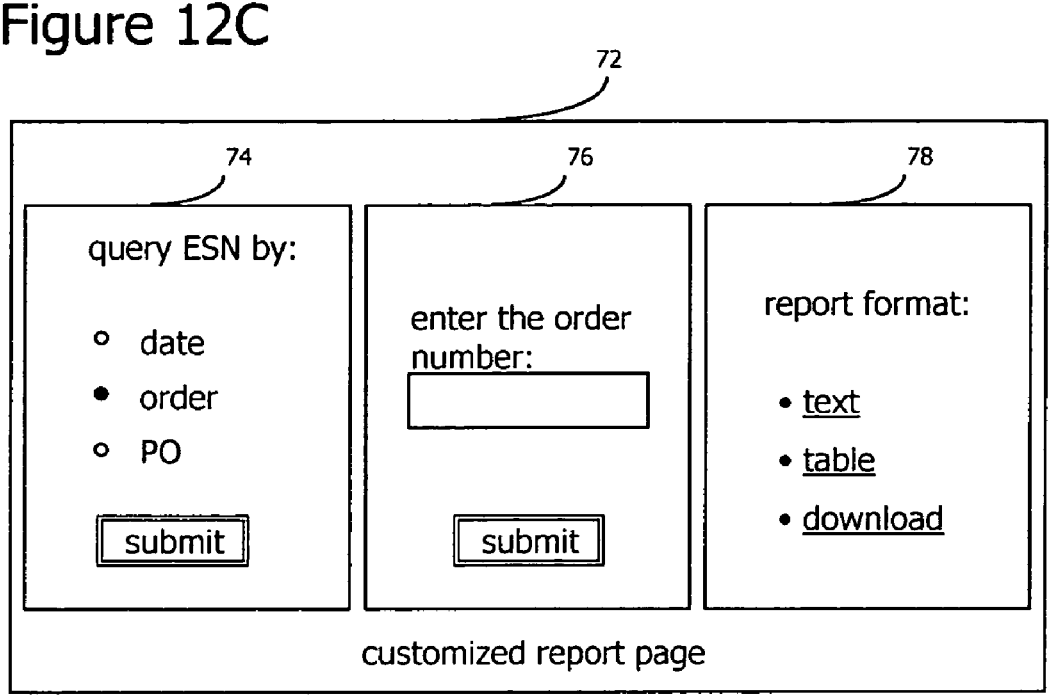

Once the data is obtained, the format frame 78 displays the various report options, as depicted in FIG. 12C. The available report formats include text and table form, or the report may be downloaded, according to one embodiment. The report information is sent to the client workstation 10 through an XML-RPC response packet 90, in one embodiment.

Where the report is downloaded, options may additionally be provided for electing a type of download. For example, in one embodiment, the customer 14 may elect to have the report exported into a Microsoft Excel® spreadsheet. In another embodiment, upon selecting the download option from the format frame 78, a menu of available reports is presented on another menu (not shown). Examples of report types include a grid (table) form, a text form, Excel® or other presentations. Those of ordinary skill in the art will recognize that report presentations may be prompted for and selected in a variety of ways.

Thus, as shown, the reports generated are based upon the subject area chosen, the type of query chosen, the parameters entered, and the report format chosen, in one embodiment. The RGS 34 processes the requests, generates a report, and transmits the report to the client workstation 10, where the web browser 84 displays the report.

Operations for generating reports are depicted in the flow diagram of FIG. 13, according to one embodiment. The customer 14 presents the access key 28 to the RGS 34, through the web browser 84 (block 302). In one embodiment, the access key 28 is passed to the main page 66 through a query string. Based on this information, a service level is assigned. The service level may be used to limit access to the database, in one embodiment.

Based upon the access information submitted, the main page 66 for the RGS 34 is loaded (block 304). Once the subject areas 64 are presented, one is selected by the customer and subsequent query 74, parameter 76, and format frames 78 are displayed, also according to customer selection (block 306). Based upon the selections made, the RGS 34 generates a report (block 308), and sends the report to the client workstation 10.

While the present invention has been described with respect to a limited number of embodiments, those skilled in the art will appreciate numerous modifications and variations therefrom. It is intended that the appended claims cover all such modifications and variations as fall within the true spirit and scope of the present invention.

The invention claimed is:

1. A system comprising:
   a server operably connected to a computer network;
   a wireless communication device inventory database operably connected to the server comprising MIN or ESN (rather than a traditional serial number) information stored in the wireless communication device inventory database, wherein the wireless communication device inventory database corresponds to an inventory of wireless communication devices maintained by a wireless communication device distributor; and
   an advanced ordering server module operably connected to the server wherein the advanced ordering server module is capable of communicating with an operably connected customer workstation.

2. The system of claim 1 wherein the wireless communication device inventory database corresponds to an inventory of wireless communication devices maintained by a wireless communication device distributor and wherein the customer workstation is operated by a seller of wireless communication devices selected from carriers, agents, retailers, resellers and dealers.

3. The system of claim 2 wherein the advanced ordering server module is maintained by the wireless communication device distributor.

4. The system of claim 1 wherein the communication between the customer workstation and the advanced ordering server module is via XML-RPC.

5. The system of claim 4 further comprising a downloadable advanced ordering client module to facilitate communications between the operably connected customer workstation and the server.

6. The system of claim 4 wherein the customer workstation sends an inventory/price request to the server.

7. The system of claim 6 wherein the server sends an inventory/price response to the customer workstation.

8. The system of claim 4 wherein the customer workstation sends an order status request to the server.

9. The system of claim 8 wherein the server sends an order status response to the customer workstation.

10. The system of claim 4 wherein the customer workstation sends an order submit request to the server.

11. The system of claim 10 wherein the server sends an order submit response to the customer workstation.

12. The system of claim 4 further comprising a report generation server module operably connected to the server for receiving report requests from a browser located on the customer workstation and sending a report to the browser on the customer workstation.

13. The system of claim 12 wherein the report is sent to the customer workstation in html format.

14. The system of claim 12 wherein the report request is based on an ESN or MIN of a wireless communication device.

15. The system of claim 1 further comprising a downloadable advanced ordering client module to facilitate communications between the operably connected customer workstation and the server.

16. The system of claim 1 wherein the customer workstation sends an inventory/price request to the server.

17. The system of claim 16 wherein the server sends an inventory/price response to the customer workstation.

18. The system of claim 1 wherein the customer workstation sends an order status request to the server.

19. The system of claim 18 wherein the server sends an order status response to the customer workstation.

20. The system of claim 1 wherein the customer workstation sends an order submit request to the server.

21. The system of claim 20 wherein the server sends an order submit response to the customer workstation.

22. The system of claim 1 further comprising a report generation server module operably connected to the server for receiving report requests from a browser located on the customer workstation and sending a report to the browser on the customer workstation.

23. The system of claim 22 wherein the report is sent to the customer workstation in html format.

24. The system of claim 22 wherein the report request is based on an ESN or MIN of a wireless communication device.

25. A method of monitoring wireless communication device inventory comprising:
   communicating a request for wireless communication device inventory data to a server from a customer workstation;
   the server connecting to a wireless communication device inventory database comprising ESN or MIN (rather than traditional serial number) information corresponding to an inventory of wireless communication devices maintained by a wireless communication device distributor and obtaining the necessary information to fulfill the request; and
   the server communicating a response to the customer workstation.

26. The method of claim 25 wherein the communication is accomplished via XML-RPC.

27. The method of claim 26 further comprising communicating report requests from a browser located on the customer workstation to the server and the server communicating a report to the browser on the customer workstation.

28. The method of claim 27 wherein the report is communicated in html format.

29. The method of claim 27 wherein the report request is based on an ESN or MIN of a wireless communication device.

30. The computer readable medium of claim 29 wherein the report is communicated in html format.

31. The method of claim 25 further comprising communicating report requests from a browser located on the customer workstation to the server and the server communicating a report to the browser on the customer workstation.

32. The method of claim 31 wherein the report is communicated in html format.

33. The method of claim 31 wherein the report request is based on an ESN or MIN of a wireless communication device.

34. The computer readable medium of claim 33 wherein the instructions for communication between the server and the customer workstation further comprise instructions for communicating via XML-RPC.

35. The computer readable medium of claim 34 wherein the report request is based on an ESN or MIN of a wireless communication device.

36. The computer readable medium of claim 33 further comprising instructions for the server receiving a report request from a browser located on the customer workstation and the server communicating a report to the browser on the customer workstation.

37. The method of claim 25 wherein the wireless communication device inventory database corresponds to an inventory of wireless communication devices maintained by a wireless communication device distributor and wherein the customer workstation is operated by a seller of wireless communication devices selected from carriers, agents, retailers, resellers and dealers.

38. The method of claim 37 wherein the advanced ordering server module is maintained by the wireless communication device distributor.

39. A computer readable medium comprising:
a set of instructions capable of being executed by a computer, the set of instructions further comprising:
instructions for receiving customer requests for wireless communication device inventory information;
instructions for querying a wireless communication device inventory database comprising ESN or MIN (rather than traditional serial number) information corresponding to an inventory of wireless communication devices maintained by a wireless communication device distributor;
instructions for communication between a server and a customer workstation; and
instructions for executing customer requests for wireless communication device inventory information.

40. The computer readable medium of claim 39, wherein the customer workstation is operated by a seller of wireless communication devices selected from carriers, agents, retailers, resellers and dealers, and wherein the set of instructions comprise instructions for updating the inventory database to correspond to changes in the inventory.

41. The computer readable medium of claim 40 wherein the advanced ordering server module is maintained by the wireless communication device distributor.

* * * * *